United States Patent [19]

Sorensen et al.

[11] 4,007,891
[45] Feb. 15, 1977

[54] JET ENGINE AIR INTAKE SYSTEM

[75] Inventors: Norman E. Sorensen, Saratoga; Eldon A. Latham, Sunnyvale, both of Calif.

[73] Assignee: The United States of America as represented by the Administrator of the National Aeronautics and Space Administration, Washington, D.C.

[22] Filed: Sept. 12, 1975

[21] Appl. No.: 612,899

[52] U.S. Cl. .................. 244/53 B; 137/15.1
[51] Int. Cl.² ........................... B64D 33/02
[58] Field of Search ........ 244/53 B; 137/15.1, 137/15.2

[56] References Cited

UNITED STATES PATENTS

| | | | |
|---|---|---|---|
| 2,934,893 | 5/1960 | Streeter | 137/15.1 |
| 3,477,455 | 11/1969 | Campbell | 137/15.1 |
| 3,495,605 | 2/1970 | Gunnarson et al. | 244/53 B X |
| 3,915,413 | 10/1975 | Sargisson | 244/53 B |

*Primary Examiner*—Trygve M. Blix
*Assistant Examiner*—Barry L. Kelmachter
*Attorney, Agent, or Firm*—Darrell G. Brekke; Gary F. Grafel; John R. Manning

[57] ABSTRACT

An axisymmetric air intake system for a jet aircraft engine comprising a fixed cowl extending outwardly from the face of the engine, a centerbody coaxially disposed within the cowl, and an actuator for axially displacing the centerbody within the cowl. The cowl and centerbody define a main airflow passageway therebetween, the configuration of which is changed by displacement of the centerbody. The centerbody includes a forwardly-located closeable air inlet which communicates with a centerbody auxiliary airflow passageway to provide auxiliary airflow to the engine. In one embodiment, a system for opening and closing the centerbody air inlet is provided by a dual-member centerbody, the forward member of which may be displaced axially with respect to the aft member. The air inlet is open when the forward centerbody member is in a first, rearward position with respect to the aft member. In a second embodiment, the centerbody air inlet may be opened and closed by doors located in the forward wall of a unitary-member centerbody. The air intake system may also be provided with closeable air inlets rearwardly-located in the cowl wall which communicate with cowl auxiliary airflow passageways to provide auxiliary airflow to the engine, either in conjunction with, or independently of, the centerbody auxiliary airflow. In addition, closeable bypass openings are provided which allow control of the normal shock wave within the main airflow passageway.

11 Claims, 7 Drawing Figures

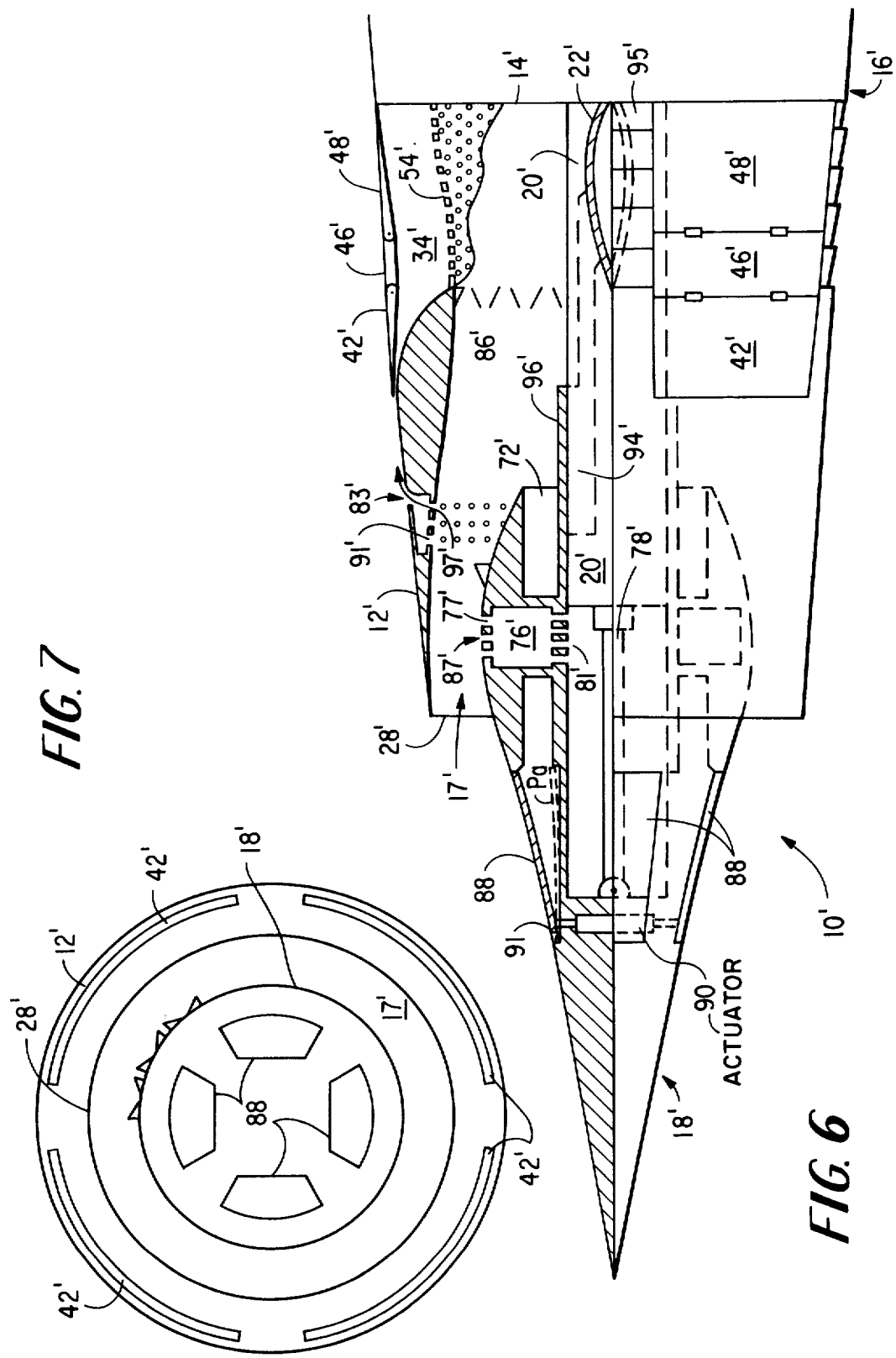

JET ENGINE AIR INTAKE SYSTEM

The invention described herein was made by employees of the United States Government, and may be manufactured and used by or for the government for governmental purposes without payment of any royalties thereon or therefor.

FIELD OF THE INVENTION

The present invention relates generally to jet engine air intake systems, and, more particularly, to axisymmetric air intake systems.

BACKGROUND OF THE INVENTION

Jet aircraft engines which are designed to operate at speeds ranging from takeoff, through subsonic and transonic, and into the supersonic, require complex air inlet configurations in order to operate efficiently throughout the entire operating range. At lower subsonic speeds, particularly at takeoff, it is desirable to allow the engine maximum access to air, since at these lower speeds there is no substantial "ramming" effect produced, whereby air is literally forced into the engine. Hence, in the low end of its operating range the engine must depend on its "gathering ability" to satisfy its large air demand. This gathering ability is a function of the area of the throat, i.e., the point along the length of the inlet at which the main airflow passageway is most constricted. In general, the larger the area of the inlet throat, the greater the gathering ability of the engine.

In addition, at takeoff, it is desirable to provide auxiliary airflow passageways in the inlet configuration, which have the effect of slowing the average speed of the airflow through all passageways of the inlet and thus preventing "sharp lip" losses (caused by separation of the airflow around the cowl lip) and "choking" of the inlet (the condition wherein the airflow through the inlet throat is sonic, i.e., Mach number = 1.0, resulting in large losses in the diffusion process up to the engine face).

Further, as the aircraft reaches transonic speeds, the airflow demands of the engine may also supersede the efficient supplying ability of the inlet since the inlet throat becomes choked.

For the foregoing reasons, it is desirable to be able to enlarge the minimum total cross-sectional area of the inlet passageway, such as by providing auxiliary airflow passageways to the engine, in order to satisfy engine transonic airflow demand. In addition, as is well known in the art, efficient supersonic operation of the engine requires that the inlet be "started," i.e., that the internal airflow in the main airflow passageway of the inlet be changed from subsonic to supersonic, as the aircraft speed increases to supersonic speeds. For axisymmetric inlet systems which operate in a mixed-compression mode, means for controlling the position of the normal shock wave in the inlet during supersonic operation is also required.

Finally, as is also well known, efficient inlet-engine operation during supersonic flight requires that a porous bleed system be provided for both cowl and centerbody which controls boundary-layer separation and the attendant internal loss in inlet-engine airflow compression efficiency.

The design of mixed-compression supersonic inlet systems for long-range supersonic cruise aircraft has centered mainly about the design Mach number requirements. Off-design requirements have generally taken secondary roles in the establishment of final designs. As a result, the off-design engine matching and performance requirements have been satisfied by complex variable geometry systems, which, in some cases, may not assure inlet-engine matching compatibility. Moreover, innovative variable geometry alternatives that have less complex design features for mixed-compression supersonic inlet systems have not been available for axisymmetric inlets.

There are a number of axisymmetric air inlet systems disclosed by the prior art which provide variable geometry inlets for use with aircraft that operate at subsonic, transonic, and supersonic velocities. Representative patents include I. R. Moorehead, U.S. Pat. No. 3,242,671; F. W. Streeter, U.S. Pat. No. 2,934,893; W. E. Skidmore, U.S. Pat. No. 3,618,876; and W. E. Skidmore et al., U.S. Pat. No. 3,664,612; although it should be noted that this listing is not, nor is it intended to be, exhaustive.

Fixed centerbody inlet systems such as those taught by the Skidmore patents characteristically provide means for varying the geometry of the cowl lip to change the capture area and configuration of the inlet entrance, as well as to create auxiliary air passages through the cowl wall when engine air demands supersede the supplying ability of the main air inlet passageway. However, such inlet systems do not provide for controlling the location of either the oblique or the normal shock waves associated with high speed flight, or for varying the configuration of the main airflow passageway for efficient supersonic airflow compression. Other fixed-centerbody inlet systems, of which the Moorehead patent is an example, provide movable cowl walls at the cowl lip which afford alteration of the inlet entrance configurations for multiple speed ranges and a variable throat air inlet passageway. However, such inlet systems do not provide auxiliary airflow passages to augment the main airflow passageway, and do not provide any means for starting mixed-compression inlet systems for supersonic operation.

Fixed centerbody inlet systems of the type taught by the Streeter patent, wherein the centerbody tip comprises a variable-shaped plug capable of limited translation with respect to the centerbody wall, do provide variable geometry main air inlet openings, auxiliary airflow passages, and a means for limited control of the location of the oblique and normal shock waves. However, since such centerbodies are essentially fixed within the cowl, they do not provide a variable throat inlet passageway to allow control of airflow characteristics, particularly for the purpose of starting the inlet for supersonic operation. In addition, the use of a partially expandable centerbody results in surface discontinuities which disrupt the airflow, and the use of an overlapping leaf construction for the centerbody permits airflow leakage through the centerbody which can create boundary layer problems.

Air inlet systems wherein the centerbody may be translated for off-design operation have proven to be aerodynamically efficient and mechanically practical for axisymmetric inlets. However, axisymmetric inlets with translating centerbodies suffer from relatively low transonic airflow capability. A tested method of overcoming this transonic deficiency is to design an inlet system which has an upstream throat (formed by the cowl and centerbody) that is greater than the downstream throat (formed by the cowl and the centerbody support tube) when the centerbody is translated to its transonic position. The downstream throat is then enlarged by using cowl doors.

The disadvantages of such systems include their complexity and their substantial weight, which can account for a considerable portion of the total inlet weight. The complexity of these systems is increased by the fact that an inherent requirement for axisymmetric inlets with relatively small diameter translating centerbodies is the necessity of maintaining the throat bleed opposite the stationary cowl bleed. As a consequence, the multiple compartments of a traveling bleed system are required.

With the advent of variable-cycle engines (VCE), which promise greater efficiency and range for supersonic cruise vehicles, additional inlet-engine matching problems must be solved. The VCE at Mach number 0.9 cruise operates as a high airflow-demand turbofan engine. Once acceleration to supersonic speeds is initiated, the cycle can be varied to the low-demand turboject mode. In the turbojet mode, the inlet supply can be reduced to match the engine demand by partially or completely closing the auxiliary airflow system. But in the turbofan mode, even with an auxiliary centerbody airflow system, there is a deficit. The deficit may be overcome simply by increasing the size of the inlet or by "high flowing" the engine (increasing the rotational speed of the compressor) to accept the higher inlet airflow. However, increasing the size of the inlet is disadvantageous because the inlet is then oversized at the design Mach number and hence there are the attendant weight and drag penalties for bypassing the extra airflow around the engine.

SUMMARY OF THE INVENTION

These and other disadvantages of the prior art are overcome by the air intake system of the present invention, which comprises a fixed cowl extending outwardly from the face of the engine, and a centerbody coaxially disposed within the cowl and translatable forwardly and rearwardly within the cowl to vary the configuration of the main airflow passage defined by the cowl and centerbody. The centerbody includes a closeable air inlet located in the forward portion thereof, and an air outlet located in the rear portion thereof, the inlet and outlet being connected by an auxiliary airflow passageway extending through the interior of the centerbody.

In a first embodiment, the centerbody comprises a conical forward member and an elongated annular aft member, the forward member being coaxially disposed within the bore in the aft member. In a second embodiment, the centerbody comprises a single integral member having a conical forward portion and an elongated annular aft portion. In the first embodiment, the centerbody air inlet comprises an annular opening formed when the forward centerbody member is translated to a rearward position with respect to the aft centerbody such that the forward member is partially received within the bore of the aft member. In the second embodiment, the centerbody air inlet comprises at least one door located in the forward portion of the centerbody.

In either embodiment, when the centerbody is translated to a forward position for takeoff to transonic operation the configuration of the main airflow passageway thereby formed provides maximum airflow through this passageway. Further, when the centerbody is translated to a rearward position, the configuration of the main airflow passageway formed thereby functions aerodynamically as a supersonic diffuser for "started" supersonic inlet operation. The fact that the centerbody is translatable also allows control of the position and area of the throat within the main airflow passageway so as to minimize pressure losses in the airflow at transonic and supersonic aircraft speeds.

In accordance with a further important feature of the invention, which is applicable to either embodiment, at least one auxiliary airflow assembly is located in the cowl wall at a rearward location adjacent to the engine face. The cowl auxiliary airflow assembly includes at least one opening in the cowl wall and an auxiliary airflow door which covers the opening. When the auxiliary airflow door is opened, the bottom face thereof cooperates with the portion of the cowl wall located adjacent to the leading edge of the opening to form a cowl auxiliary airflow passageway which functions as a subsonic diffuser. This auxiliary airflow passageway provides additional airflow at takeoff and transonic speeds to augment the airflow provided by the main airflow and the centerbody auxiliary passageways. The cowl auxiliary airflow assembly may also include a bypass door, the opening and closing of which during "starting" of the inlet for supersonic operation, and supersonic operation itself, controls the position of the normal shock wave within the main airflow passageway. In addition, the bypass door may be opened at takeoff to provide additional auxiliary airflow to the engine.

Preferably, both embodiments of the present invention also include centerbody and cowl wall porous bleed systems for control of boundary layer separation at supersonic speeds. Advantageously, the centerbody is slidably mounted on a hollow support tube which is in turn coaxially mounted within the cowl by means of at least one hollow support strut extending from the cowl wall. The centerbody porous bleed system is ducted through the hollow support tube and support strut to centerbody bleed louvers located in the cowl wall, when the centerbody is translated to its rearward positions, on the support tube.

Other features and advantages of the invention will be set forth in, or apparent from, the detailed description of the preferred embodiments found hereinbelow.

DESCRIPTION OF THE FIGURES

FIG. 6 is a side-elevation, partially in section, and partially cut away, of a second embodiment of the auxiliary airflow inlet system of the present invention.

FIG. 7 is an end view of the embodiment of FIG. 6.

DESCRIPTION OF THE PREFERRED EMBODIMENTS

Figures 1, 2:
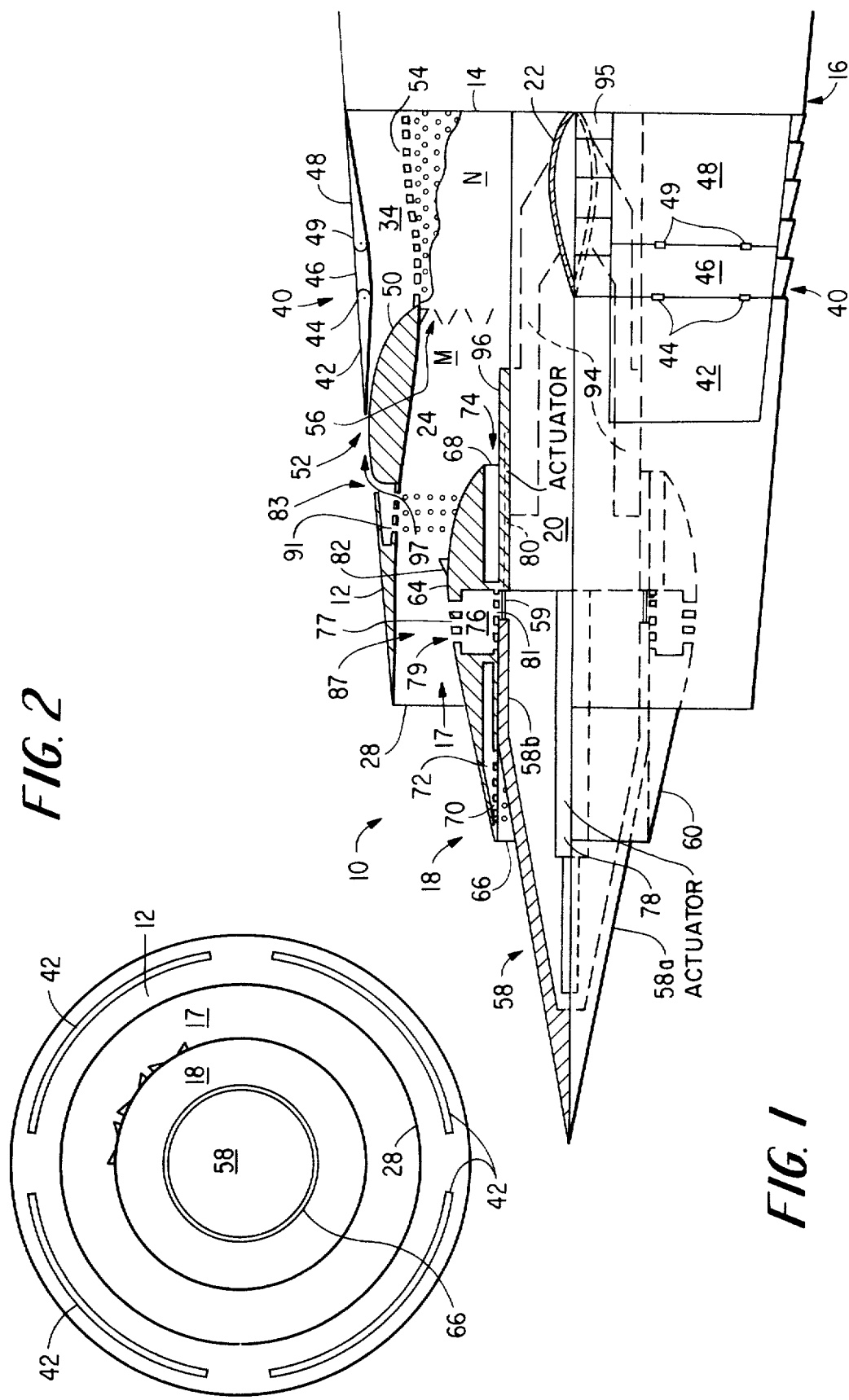
FIG. 1 is a side elevation, partially in section, partially cut away, of a first embodiment of the auxiliary airflow inlet system of the present invention.
FIG. 2 is an end view of the embodiment of FIG. 1.

Referring to FIGS. 1 and 2, a first embodiment of the auxiliary airflow inlet system for axisymmetric supersonic jet propulsion air intake systems, generally denoted 10, comprises a cowl 12 fixedly attached to the face 14 of an engine nacelle 16, and a centerbody assembly 18 coaxially disposed within cowl 12 and slidably mounted on a hollow support tube 20. Support tube 20 is in turn suspended within cowl 12 by means of four circumferentially spaced support struts 22, which extend radially outward from the exterior surface of tube 20 at positions substantially adjacent to engine face 14 to engage the interior surface 24 of cowl 12. The support struts 22 are hollow to provide ducting for the centerbody-boundary layer bleed airflow as will be described in more detail hereinbelow.

The exterior of cowl 12 is generally frustum-shaped, with the upstream or leading edge, which is denoted 28 and defines the entrance to cowl 12, having a relatively smaller circumference than the trailing edge at engine face 14. Cowl 12 includes four cowl auxiliary airflow assemblies 40 located therein at spaced locations about the aft portion of cowl 12. Each cowl airflow assembly 40 comprises a generally rectilinear plenum chamber, or opening 34 covered by an associated door assembly. The door assembly comprising a forwardly located auxiliary airflow door 42 pivotedly connected along its rear edge by hinges, indicated at 44, to the forward edge of a medial support strip 46 formed from the cowl wall, and a rearwardly located bypass door 48 pivotedly connected along its forward edge by hinges, indicated at 49, to the rear edge of medial support strip 46. Both doors 42 and 48 may be opened outward to an open position by suitable actuating means (not shown). The lower surface of airflow door 42 has an aerodynamic shape which, as shown, cooperates with aerodynamic surface 50 when door 42 is partially open to form an auxiliary airflow passageway 52, leading to chamber 34, that acts aerodynamically as a subsonic diffuser. A porous screen 54 extends across the bottom of plenum chamber 34 in coplanar relationship with the inner surface 24 of cowl 12, thus separating the chamber 34 from the main airflow passageway 17.

As shown in FIG. 1, the interior surface 24 of cowl 12 gradually slopes inward toward the longitudinal axis of cowl 12 from an extreme taper at leading edge 28 to form a constricted passage area, indicated at M, which is located slightly downstream of the mid-section of cowl 12. This surface then slopes slightly outward to form a passage area, indicated at N, adjacent to the engine face 14, which has a slightly larger cross-section area than that of passage area M. A series of spaced vortex generators 56 are located on the interior surface 24 of cowl 12 for controlling airflow distortions at the engine face when centerbody assembly 18 is translated to rearward positions associated with cruise and off-design started operation, as will be discussed further hereinbelow. The vortex generators 56 are triangularly-shaped plates disposed circumferentially about the inner surface 24 of cowl wall 26 at a location corresponding to the rear portion of constricted passage M. The angle of attack of said generators is approximately 16°.

Centerbody assembly 18 comprises a centerbody cone member 58 coaxially mounted for sliding movement within an elongated annular aft centerbody 60.

Cone 58 comprises a forward conical portion 58a and a relatively short hollow cylindrical portion 58b. The inside diameter of cylindrical portion 58b of cone 58 corresponds to the outside diameter of support tube 20. The outer wall 64 of aft centerbody 60 has an exterior surface which initially slopes outward from the forward edge 66 with a slope equal to that of the exterior surface of conical portion 58a of cone 58. As shown, the surface of wall 64 curves outwardly in the area of the mid-section of aft centerbody 60 and then tapers to meet the upper rear edge 68 of aft centerbody 60. The forward portion of the annulus of aft centerbody 60 contains a series of openings 70 for at least one auxiliary airflow passage 72. Passage 72 extends the entire length of aft centerbody 60 and exits through a rearward-facing opening 74.

In accordance with one important feature of the invention, cone 58 and aft centerbody 60 of centerbody assembly 18 may be translated rearwardly and forwardly on support tube 20 either in combination or independently of one another. This capability is provided in the exemplary embodiment under consideration by a main actuator 78, which extends from the forward end of support tube 20, through the interior of cone member 58, to engage member 58 near its apex, and a secondary actuator 80, which is mounted in the aft portion of centerbody 60 and engages the rear edge of the cylindrical portion 58b of cone member 58 with rod 59. The lower surface of the housing for secondary actuator 80 conforms to the contour of support tube 20. When secondary actuator 80 is energized, aft centerbody 60 is moved with respect to centerbody cone 58 and support tube 20. When main actuator 78 is activated, centerbody cone 58 and aft centerbody 60 are moved in unison and with respect to support tube 20.

The aft centerbody 60 also includes a series of spaced vortex generators 82, similar to vortex generators 56, which control airflow distortions at the engine face when centerbody assembly 18 is translated to its maximum rearward positions. The vortex generators 82 are triangularly-shaped plates disposed circumferentially about the outer surface of aft centerbody 60 at a location aft of the mid-section thereof, such that when centerbody assembly 18 is translated to its maximum rearward position vortex generators 82 are disposed relatively opposite cowl vortex generators 56.

Porous bleed systems 83 and 87 are provided for cowl 12 and centerbody assembly 18, respectively, to prevent boundary layer separation at the higher supersonic speeds (approximately above Mach 1.6), such boundary layer separation having the effect of decreasing the internal pressure at the engine face. Holes 91 permit bleed airflow 97 to pass from the interior surface 24 to the exterior surface of cowl 12. Aft centerbody 60 has one or more bleed plenum chambers 76. Apertures 77 and 81 are the only passageways connecting with plenum chambers 76. When centerbody 60 is translated downstream on support tube 20 (in the supersonic mode), bleed air 79 is channeled through apertures 77, plenum chambers 76, apertures 81, passages 94, centerbody struts 22 and louvers 95. When bleed system 87 is not in use, cylindrical portion 96 of aft centerbody 60 blocks off the entrance to passages 94. Plenum chamber 76 may not encircle the entire aft centerbody 60. If this were done, passage 72 would be blocked. Ideally, multiple chambers 76 are symmetrically stationed around the centerbody 60 are alternated with passageways 72.

Figure 3:
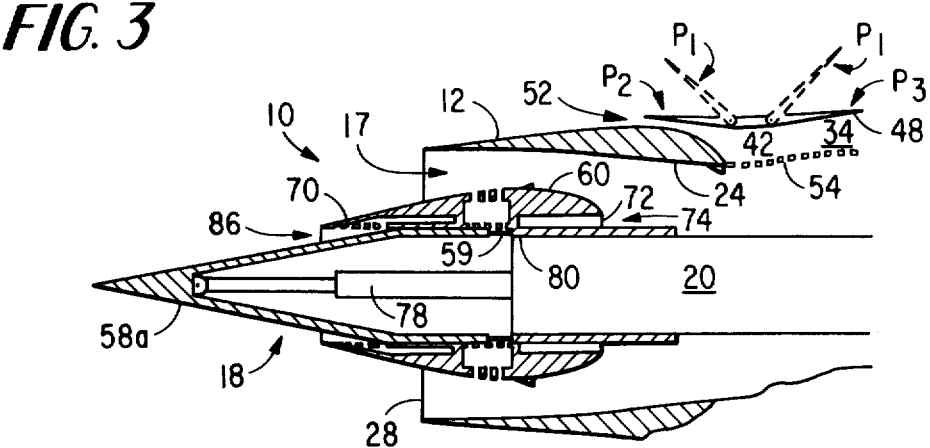
FIG. 3 is a diagrammatic side elevation of the embodiment of FIG. 1 illustrating the positions of the basic components thereof for the take-off-to-transonic operation mode.
Figure 4:
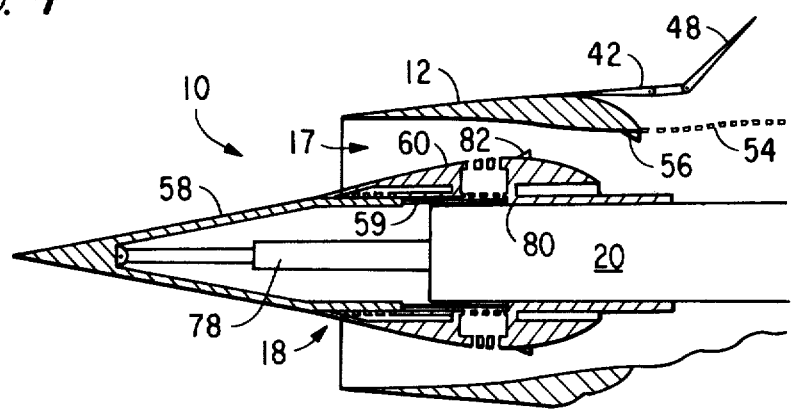
FIG. 4 is a diagrammatic side elevation of the embodiment of FIG. 1 illustrating the positions of the basic components thereof for started inlet operation at supersonic Mach numbers less than cruise.
Figure 5:
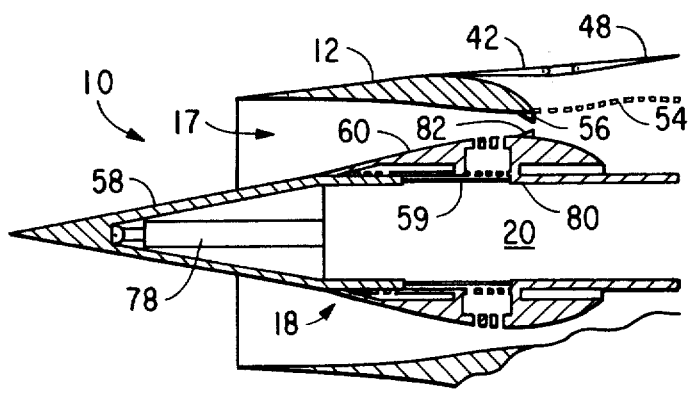
FIG. 5 is a diagrammatic side elevation of the embodiment of FIG. 1 illustrating the positions of the basic components thereof for the supersonic cruise started mode.

Referring to FIGS. 3 through 5, the operation of the first embodiment of the auxiliary airflow inlet system 10 will now be described. Bleed systems 83 are not shown in FIGS. 3 to 5. FIG. 3 illustrates the positions of the basic components of the system 10 for the take-off-to-transonic operating mode. In this mode centerbody assembly 18 is translated to a forward position at the entrance to cowl 12 wherein aft centerbody 60 is positioned in its maximally forward location, extending partially beyond the entrance to cowl 12 defined by edge 28, and cone 58 is positioned in its maximally rearward position in relation to aft centerbody 60. When the centerbody assembly 18 is so disposed, the main air inlet passage 17 defined between cowl wall 24 and aft centerbody wall 64 allows the maximum airflow to the engine. A toroidal opening 86 is defined between the main annulus of centerbody 60 and the conical portion 58a of cone centerbody 58, and it is in communication with centerbody auxiliary airflow passage 72 through openings 70 in aft centerbody 60. The auxiliary air inlet passage through centerbody assembly 18 which is thereby formed allows additional airflow to reach the engine. The gathering ability of the engine on take-off is further enhanced by maintaining auxiliary airflow door 42 and bypass doors 48 in a maximum open position indicated by dahsed lines at $P_1$, as shown.

If the air demands of the engine exceed the supplying ability of main air inlet passage 17 and the centerbody auxiliary air inlet passage as the aircraft reaches transonic velocities, additional quantities of air are supplied to the engine by modulating the cowl auxiliary airflow doors 42 to a portion indicated at $P_2$ to form cowl auxiliary air passages 52, which act aerodynamically as subsonic diffusers to deaccelerate the airflow into plenum chamber 34 and hence minimize the pressure losses normally associated with this type of door. The cowl auxiliary airflow then passes through porous screens 54 where it joins the other airflows as they enter the engine face.

It should be noted that beyond takeoff and through transonic speeds, bypass doors 48 are not used when cowl auxiliary airflow is needed, and are maintained in a closed position $P_3$, as shown.

FIG. 4 illustrates the positions of the basic components of auxiliary inlet system 10 for started inlet operation at supersonic Mach numbers less than cruise. In this mode, cone member 58 is translated forward with respect to aft centerbody 60 by means of secondary actuator 80 so as to eliminate toroidal opening 86 and provide the forward portion of centerbody assembly 18 with a continuous exterior surface that presents an extended conical profile. Centerbody assembly 18 is translated to an intermediate rearward position determined by the Mach number of the aircraft. Cowl auxiliary airflow doors 42 are closed and the bypass doors 48 are modulated so as to position the normal shock wave just downstream of the minimal throat area. The inlet is then in a started condition and the engine operates with maximum efficiency.

FIG. 5 illustrates the positions of the basic components of auxiliary air inlet system 10 for the supersonic cruise started mode. The basic component positions are as described for started inlet operation at supersonic Mach numbers less than cruise, described hereinabove, except that centerbody assembly 18 is translated to its maximal rearward, or cruise position, as shown, and that bypass doors 48 are modulated so as to be closed or only slightly open to maintain the normal shock wave at a point just downstream of the inlet throat area as the centerbody 18 is translated to the cruise position. With centerbody assembly 18 in the cruise position, main air inlet passage 84, defined as above, acts aerodynamically as a supersonic diffuser. With the normal shock wave positioned as described, the supersonic flow upstream of the normal shock wave is decelerated as it proceeds down the supersonic diffuser formed by the interior cowl wall 24 and the exterior surface of centerbody assembly 18 until, at the throat, the flow velocity is slightly greater than Mach 1. Since the flow velocity is slightly greater than Mach 1 at the normal shock, the pressure loss through the shock is negligible and the engine operates with maximum efficiency at supersonic cruise speeds. At cruise speeds there is little or no bypass airflow through bypass doors 48, and porous screens 54 provide a reasonably good aerodynamic surface, as compared to a nonporous surface.

Turning now to FIGS. 6 and 7, a second embodiment of auxiliary inlet airflow system 10 will be described. With the exception of the differences described hereinbelow, this embodiment is similar to that of FIG. 1 and corresponding elements in FIGS. 6 and 7 have been given the same numbers with primes attached. Centerbody assembly 18' comprises a single member having an exterior shape corresponding to that of centerbody assembly 18 of the first embodiment when cone member 58 is translated to a forward position with respect to aft centerbody 60 such that the exterior surface of cone member 58 is continuous with the exterior surface of aft centerbody 60.

There is no element in this embodiment corresponding to secondary actuator 80 of the embodiment of FIG. 1. Located in spaced positions around the periphery of the conical forward portion of centerbody 18' are four hinged auxiliary airflow doors 88. Doors 88 are hinged along the forward edge at point 91. Actuators 90 are provided to permit the movement of doors 88 either inward or outward. When doors 88 are in position $P_a$ they provide openings for auxiliary air passages 72' extending through the wall of centerbody assembly 18'.

The operation of the second embodiment is essentially the same as described hereinabove for the first embodiment is essentially the same as described hereinabove for the first embodiment, with the exceptions that there is obviously no independent translation of the forward portion of centerbody assembly 18' with respect to the aft or rearward portion, and that the auxiliary airflow passage through centerbody 18' (which was provided in FIG. 1 through the translation of one portion with respect to the other as described above), is provided here by the opening of auxiliary airflow doors 88.

Although the invention has been described relative to exemplary embodiments thereof, it will be understood by those skilled in the art that variations and modifications may be effected in the embodiments without departing from the scope and spirit of the invention.

What is claimed is:

1. An axisymmetric air intake system for a jet aircraft engine comprising a fixed cowl extending outwardly from the face of said engine, a centerbody coaxially disposed within said cowl, said cowl and said centerbody defining a main airflow passageway therebetween with a throat, means for axially displacing said centerbody within said cowl so as to change the position of said throat for optimum performance at different aircraft speeds, means for increasing airflow to said jet engine face at least at aircraft speeds from takeoff to transonic, said last-named means including a cowl auxiliary airflow assembly and a forwardly located closeable air inlet in said centerbody, a centerbody airflow passageway connecting said centerbody inlet to said engine face, means for opening and closing said centerbody air inlet, and means for bleeding air from a region adjacent to said centerbody to a region external to said cowl when said aircraft is in the supersonic mode.

2. The air intake system of claim 1 wherein said means for closing said air inlet comprises at least one door located in the wall of said centerbody.

3. The air intake system of claim 1 wherein said cowl auxiliary airflow assembly comprises an opening in a wall of said cowl and a cowl auxiliary airflow door covering said opening, the interior face of said cowl door cooperating with an opposing surface of said cowl wall when said cowl door is in an open position to form a cowl auxiliary airflow passageway which acts aerodynamically as a subsonic diffuser.

4. The air intake system of claim 3 wherein said centerbody is displaced to a first forward position for subsonic and transonic flight and to a second, rearward position for supersonic flight, said centerbody and the interior surface of said cowl being shaped such that an optimum inlet configuration for said main airflow passageway is provided and said main airflow passageway acts aerodynamically as a supersonic diffuser when said centerbody is displaced to said rearward position.

5. The air intake system of claim 3 wherein said cowl auxiliary airflow assembly comprises a second opening in said cowl wall and a cowl bypass door covering said second opening, the opening and closing of said bypass door controlling the position of the normal shock wave formed within said main airflow passageway at transonic and supersonic velocities.

6. The air intake system of claim 1 wherein said centerbody comprises a forwardly located first member, and a rearwardly located second member which is coaxial with said first member and has a longitudinal bore therein in which said first member is received, a forward portion of said first centerbody member having a substantially conical shape; said means for opening and closing said air inlet comprising means for translating said first centerbody member rearwardly and forwardly with respect to said second centerbody member, and said centerbody air inlet comprising an annular opening in said centerbody formed when said first centerbody member is translated to a rearward position with respect to said second centerbody member such that said conical portion of said first centerbody member is partially received within said bore of said second centerbody member.

7. The air intake system of claim 6 wherein said cowl airflow assembly comprises an opening in a wall of said cowl and a cowl auxiliary airflow door covering said opening, the interior face of said cowl door cooperating with an opposing surface of said cowl wall, when said cowl door is in an open position, to form a cowl auxiliary airflow passageway which acts aerodynamically as a subsonic diffuser.

8. The air intake system of claim 7 wherein said centerbody is displaced to a first, forward position for subsonic and transonic flight and to a second, rearward position for supersonic flight, said centerbody and the interior surface of said cowl being shaped such that an optimum inlet configuration for said main airflow passageway is provided and said main airflow passageway acts aerodynamically as a supersonic diffuser when said centerbody is displaced to said rearward position.

9. The air intake system of claim 6 wherein said cowl auxiliary airflow assembly comprises an opening in a wall of said cowl and a cowl bypass door convering said opening, the opening and closing of said bypass door controlling the position of the normal shock wave formed within said main airflow passageway at transonic and supersonic velocities.

10. The air intake system of claim 9 wherein said centerbody is slidably mounted on a hollow support tube mounted coaxially within said cowl by means of at least one spaced hollow support strut.

11. The air intake system of claim 10 wherein said bleeding means includes a porous centerbody surface, means for communicating the interior side of said porous surface to the interior of said support tube when said centerbody is translated rearwardly on said support tube, at least one exit louver in an exterior wall of said cowl, and a passageway coupling said interior of said support tube to said exit louver.

* * * * *